United States Patent
Anichkov (10) Patent No.: US 12,326,704 B2
(45) Date of Patent: Jun. 10, 2025

(54) METHOD AND SYSTEM FOR PROVIDING PRIMARY FREQUENCY RESPONSE FOR A RENEWABLE ENERGY PLANT

(71) Applicant: MERIT SI, LLC, Clinton, NJ (US)

(72) Inventor: Dmitriy Anichkov, Somerville, NJ (US)

(73) Assignee: MERIT SI, LLC, Clinton, NJ (US)

( * ) Notice: Subject to any disclaimer, the term of this patent is extended or adjusted under 35 U.S.C. 154(b) by 515 days.

(21) Appl. No.: 17/683,419

(22) Filed: Mar. 1, 2022

(65) Prior Publication Data
US 2022/0283558 A1 Sep. 8, 2022

Related U.S. Application Data

(60) Provisional application No. 63/155,826, filed on Mar. 3, 2021.

(51) Int. Cl.
G05B 19/042 (2006.01)
G05B 15/02 (2006.01)
(Continued)

(52) U.S. Cl.
CPC ............... *G05B 19/042* (2013.01); *H02J 3/28* (2013.01); *H02J 3/381* (2013.01); *G05B 15/02* (2013.01);
(Continued)

(58) Field of Classification Search
CPC .................. G05B 15/02; G05B 19/042; G05B 2219/2639; H02J 3/28; H02J 3/381; H02J 2300/24; H02J 2300/28; H02J 3/241
See application file for complete search history.

(56) References Cited

FOREIGN PATENT DOCUMENTS

WO WO-2019199806 A1 * 10/2019 ................ H02J 3/06

OTHER PUBLICATIONS

Morjaria et al. "A Grid-Friendly Plant" from "IEEE Power and Energy Magazine (May/Jun. 2014)" (Year: 2014).*
(Continued)

*Primary Examiner* — Yuhui R Pan
(74) *Attorney, Agent, or Firm* — OSTROLENK FABER LLP (57) ABSTRACT

A method for providing primary frequency response for a renewable energy plant coupled to an electric power grid, the renewable energy plant having an intermittent energy source coupled thereto by an inverter, the method comprising: using a renewable energy plant control system, measuring frequency and determining a first difference signal between the measured frequency and a frequency reference; measuring power output from the renewable energy plant and determining a second difference signal between the measured power output and a power reference; generating an error signal from a sum of the first and second difference signals; generating a control signal by applying the error signal to a controller; limiting the control signal output from the controller to between predetermined minimum and maximum power limits for the inverter; while the control signal is limited by the predetermined minimum power limit for the inverter, disabling an integral function of the controller; and, applying the control signal to the inverter to control the power output from the intermittent energy source.

20 Claims, 5 Drawing Sheets

(51) Int. Cl.
  *H02J 3/28* (2006.01)
  *H02J 3/38* (2006.01)
(52) U.S. Cl.
  CPC ... *G05B 2219/2639* (2013.01); *H02J 2300/24* (2020.01); *H02J 2300/28* (2020.01)

(56) References Cited

OTHER PUBLICATIONS

WECC Solar Plant Dynamic Modeling Guidelines (Apr. 2014) 26 pages. http://www.wecc.biz/committees/StandingCommittees/PCC/TSS/MVWG/Shared%20Documents/MVWG%20Approved%20Documents/WECC%20Solar%20Plant%20Dynamic%20Modeling%20Guidelines.pdf.

"Essential Reliability Services and the Evolving Bulk-Power System—Primary Frequency Response"; United States of America Federal Energy Regulatory Commission 18 CFR Part 35; Order No. 842 (Feb. 2018) 199 pp. 10.

* cited by examiner

FIG. 1

PRIOR ART

METHOD AND SYSTEM FOR PROVIDING PRIMARY FREQUENCY RESPONSE FOR A RENEWABLE ENERGY PLANT

This application claims priority from and the benefit of the filing date of U.S. Provisional Patent Application No. 63/155,826, filed Mar. 3, 2021, and the entire content of such application is incorporated herein by reference.

FIELD OF THE INVENTION

This application relates to the field of control systems, and more specifically, to a method and system for providing primary frequency response for a renewable energy plant.

BACKGROUND OF THE INVENTION

The ability of a power system to maintain its electrical frequency within a safe range is crucial for stability and reliability. Frequency response is a measure of an interconnection's ability to stabilize the frequency immediately following the sudden loss of generation or load. The United States Federal Energy Regulatory Commission ("FERC") recently revisited primary frequency response regulations in Order No. 842 (See "UNITED STATES OF AMERICA FEDERAL ENERGY REGULATORY COMMISSION 18 CFR Part 3500; Order No. 842; Essential Reliability Services and the Evolving Bulk-Power System-Primary Frequency Response"; issued Feb. 15, 2018; and, incorporated herein by reference). Reliable power system operation depends on system frequency. Frequency deviation from nominal is caused by power imbalance due to abrupt momentous changes in load or generation. Significant frequency excursion can trip generation units and loads. Inertial response, primary frequency response, and secondary frequency response mitigate frequency deviation. Primary frequency response, collectively provided by system generators, is intended to arrest frequency deviation keeping it within an acceptable range.

In the above mentioned Order, the FERC states that customers "shall ensure that the Large Generating Facility's real power response to sustained frequency deviations outside of the deadband setting is automatically provided and shall begin immediately after frequency deviates outside of the deadband, and to the extent the Large Generating Facility has operating capability in the direction needed to correct the frequency deviation."

Figure 1:
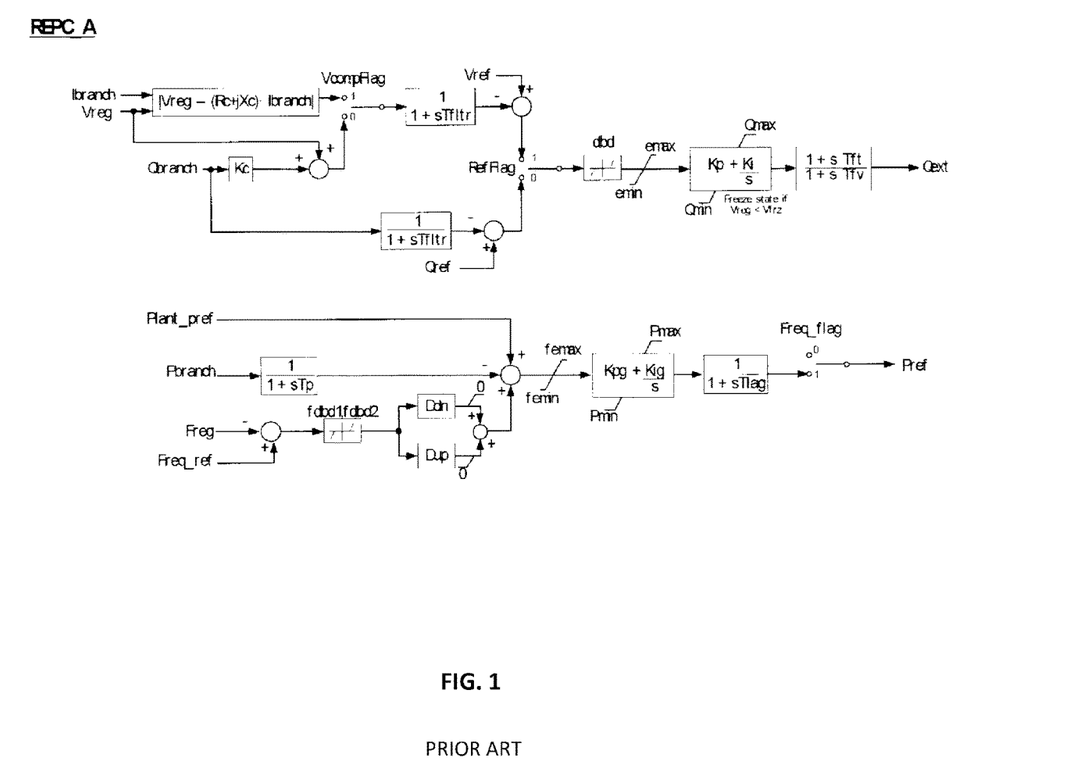
FIG. 1 is a block diagram illustrating a control system for a renewable energy plant in accordance with the prior art.

Renewable energy plants typically include solar photovoltaic ("PV") and wind intermittent energy sources. Both PV and wind systems are rapidly growing in quantity and size making their frequency response even more important. FIG. 1 is a block diagram illustrating a control system for a renewable energy plant in accordance with the prior art. (See "WECC Solar Plant Dynamic Modeling Guidelines"; dated April 2014; and incorporated herein by reference.) Such control systems typically include the following. First, closed loop voltage regulation at a user-designated bus. The voltage feedback signal has provisions for line drop compensation, voltage droop response, and a user-settable deadband on the voltage error signal. Second, closed loop reactive power regulation on a user-designated branch with a user-settable deadband on the reactive power error signal. Third, a plant-level governor response signal derived from frequency deviation at a user designated bus. The frequency droop response is applied to active power flow on a user-designated branch. Frequency droop control is capable of being activated in both over and under frequency conditions. The frequency deviation applied to the droop gain is typically subject to a user-settable deadband.

One problem with such existing control systems is that a renewable power inverter may halt generation when its power generation command is set below a certain low power limit. The inverter low power limit for an inverter may be, for example, 1% of its nominal capability. In such an operating condition, the inverter will not follow the plant governor response command. It may take a several-minute timeout period for the inverter to start delivering power again after receiving a power command above the inverter low power limit. Consequently, a plant curtailed below a certain low power limit will not comply with the above-mentioned FERC order since it cannot provide immediate real power response to a sustained underfrequency deviation.

Another problem with such existing control systems is that, during the timeout, the integral term of the proportional-integral power controller winds up and when the inverter re-starts, the plant's active power may spike up above the power reference.

A need therefore exists for an improved method and system for providing primary frequency response for a renewable energy plant. Accordingly, a solution that addresses, at least in part, the above and other shortcomings is desired.

SUMMARY OF THE INVENTION

According to one aspect of the application, there is provided a method for providing primary frequency response for a renewable energy plant coupled to an electric power grid, the renewable energy plant having an intermittent energy source coupled thereto by an inverter, the method comprising: using a renewable energy plant control system, measuring frequency and determining a first difference signal between the measured frequency and a frequency reference; measuring power output from the renewable energy plant and determining a second difference signal between the measured power output and a power reference; generating an error signal from a sum of the first and second difference signals; generating a control signal by applying the error signal to a controller; limiting the control signal output from the controller to between predetermined minimum and maximum power limits for the inverter; while the control signal is limited by the predetermined minimum power limit for the inverter, disabling an integral function of the controller; and, applying the control signal to the inverter to control the power output from the intermittent energy source.

In accordance with further aspects of the application, there is provided an apparatus such as an information system, a control system, a computer system, etc., a method for adapting these, as well as articles of manufacture such as a computer readable medium or product and computer program product or software product (e.g., comprising a non-transitory medium) having program instructions recorded thereon for practicing the method of the application.

BRIEF DESCRIPTION OF THE DRAWINGS

Further features and advantages of the embodiments of the present application will become apparent from the following detailed description, taken in combination with the appended drawings, in which.

It will be noted that throughout the appended drawings, like features are identified by like reference numerals.

DETAILED DESCRIPTION OF THE EXAMPLE EMBODIMENTS

In the following description, details are set forth to provide an understanding of the application. In some instances, certain software, circuits, structures and methods have not been described or shown in detail in order not to obscure the application. The term "information system" or "system" is used herein to refer to any machine for processing data, including the control systems, controllers, energy management systems, supervisory control and data acquisition ("SCADA") systems, computer systems, and network arrangements described herein. The present application may be implemented in any computer programming language provided that the operating system of the data processing system provides the facilities that may support the requirements of the present application. Any limitations presented would be a result of a particular type of operating system or computer programming language and would not be a limitation of the present application. The present application may also be implemented in hardware or in a combination of hardware and software.

According to one embodiment of the application, there is provided an improved method and system for providing primary frequency response for a renewable energy plant coupled to an electric power grid, the renewable energy plant having an intermittent energy source. According to another embodiment, there is provided a method for controlling energy sources for a renewable energy plant, wherein the plant is connected to a power grid and the plant has an intermittent energy source whose output is dependent on environmental variables. According to another embodiment, there is provided an improved method and system for controlling a renewable energy plant including characterization of the plant. According to another embodiment, there is provided a method for controlling plant energy sources, wherein the plant is connected to a power grid, the plant has an intermittent energy source dependent on environmental variables, and a plant performance model.

Figure 2:
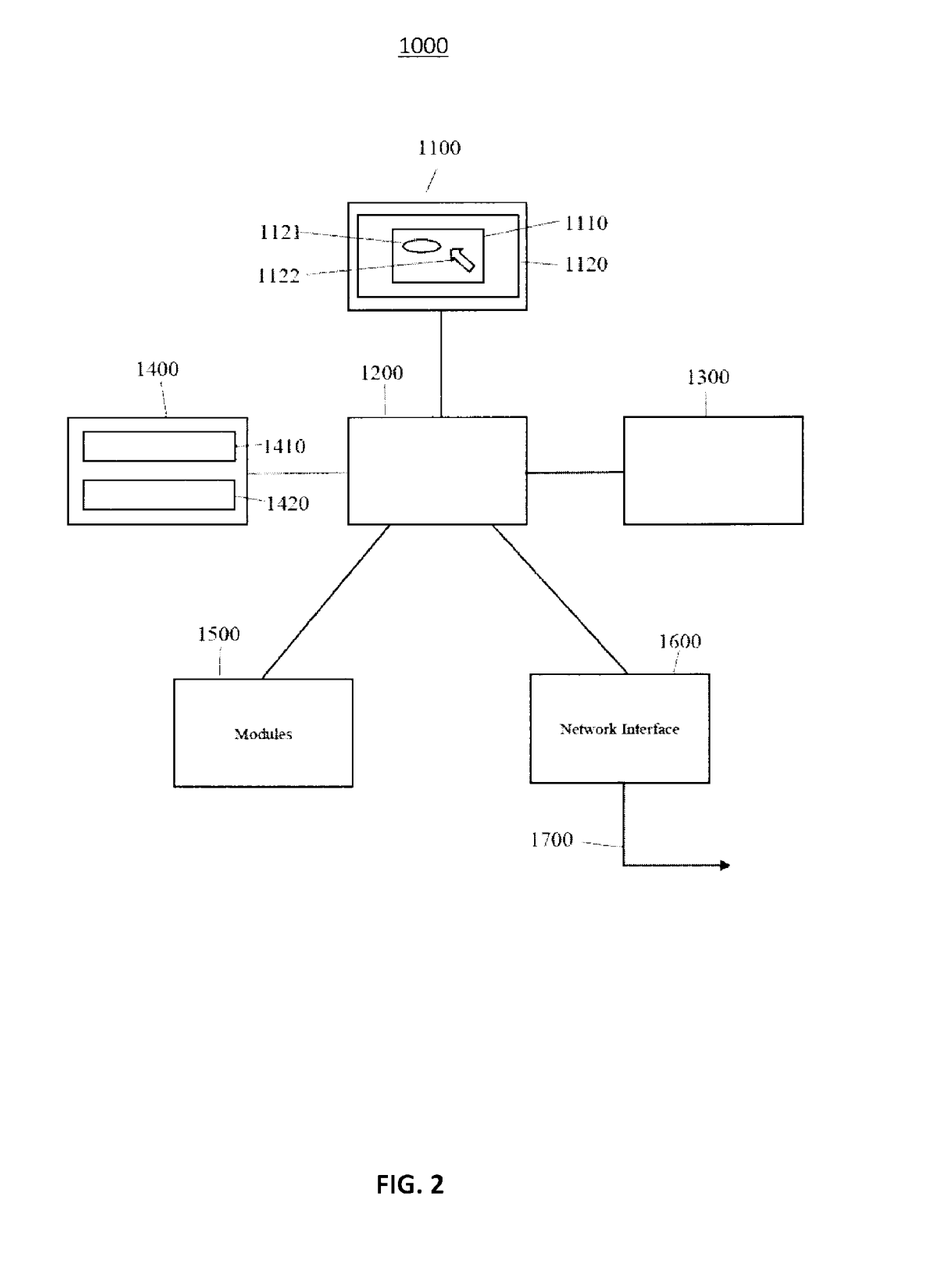
FIG. 2 is a block diagram illustrating an information system in accordance with an embodiment of the application.

FIG. 2 is a block diagram illustrating an information system 1000 in accordance with an embodiment of the application. The information system 1000 is suitable for performing as a control system (e.g., 2800), controller (e.g., 5030), supervisory control and data acquisition ("SCADA") system (e.g., 2900), energy management system ("EMS"), or the like. The information system 1000 may be implemented as a virtual machine. The information system 1000 may be a client and/or a server in a client-server configuration. As an example, the information system 1000 may be a server and/or a personal computer. The information system 1000 may be a distributed system deployed on multiple processors or hosts.

The information system 1000 includes a display 1100, a processor or CPU 1200, an input device 1300, memory 1400, and an interface device 1600. The display 1100 may include a computer screen or a television screen. The CPU 1200 is coupled to a memory 1400 that stores an operating system 1420 to manage the information system 1000. The CPU 1200 is operatively coupled to an input device 1300 for receiving user commands and to the display 1100 for displaying the results of these commands to a user. These commands may also be received over a network 1700 via the interface device 1600. The CPU 1200 may operate in association with dedicated co-processors, memory devices, or other hardware modules 1500. The input device 1300 may include a keyboard, mouse, touchpad, or the like. The memory 1400 may include a plurality of storage devices including an internal memory and an external storage device. For example, memory 1400 may include databases, random access memory, read-only memory, flash drives, and/or hard disk devices. The information system 1000 may include a database management system and a database 1410 that may be stored in the memory 1400 of the information system 1000. The interface device 1600 may include one or more network connections. The information system 1000 may be adapted to communicate with other information systems over a network 1700 (e.g., control system 2800, controller 5030, master SCADA/EMS 2900) via the interface device 1600. For example, the interface device 1600 may include an interface to a network 1700 such as the Internet and/or a wireless network. Thus, the interface 1600 may include suitable transmitters, receivers, connectors, and the like. The information system 1000 may be associated with other information systems (e.g., 2800, 2900, 5030) over the network 1700. Of course, the information system 1000 may include additional software and hardware, the description of which is not necessary for understanding the invention.

The information system 1000 includes programmed computer-executable instructions to implement embodiments of the present invention. The instructions may be embodied in one or more hardware modules 1500 or program (software) modules (e.g., 1420) resident in the memory 1400 of the information system 1000. Alternatively, programmed instructions may be embodied on a machine-readable medium or product such as one or more DVDs, CDs, etc.

A user may interact with the information system 1000 using a user interface ("UI") 1120 such as a graphical user interface. The UI 1120 may be used for monitoring, managing, and accessing the information system 1000. Typically, a UI is used to display information to and receive commands from users and includes a variety of controls including icons, drop-down menus, toolbars, text, buttons, and the like. A user interacts with the UI 1120 presented on a display 1100 by using an input device 1300 to position a pointer or cursor 1122 over a graphical object, for example, an icon, menu, etc. 1121 and by selecting the object 1121. Typically, UI elements are presented in at least one window 1110, that is, a rectangular area within the display 1100. A window 1110 may be open, closed, displayed full screen, reduced in size, or moved to different areas of the display 1100.

Figure 3:
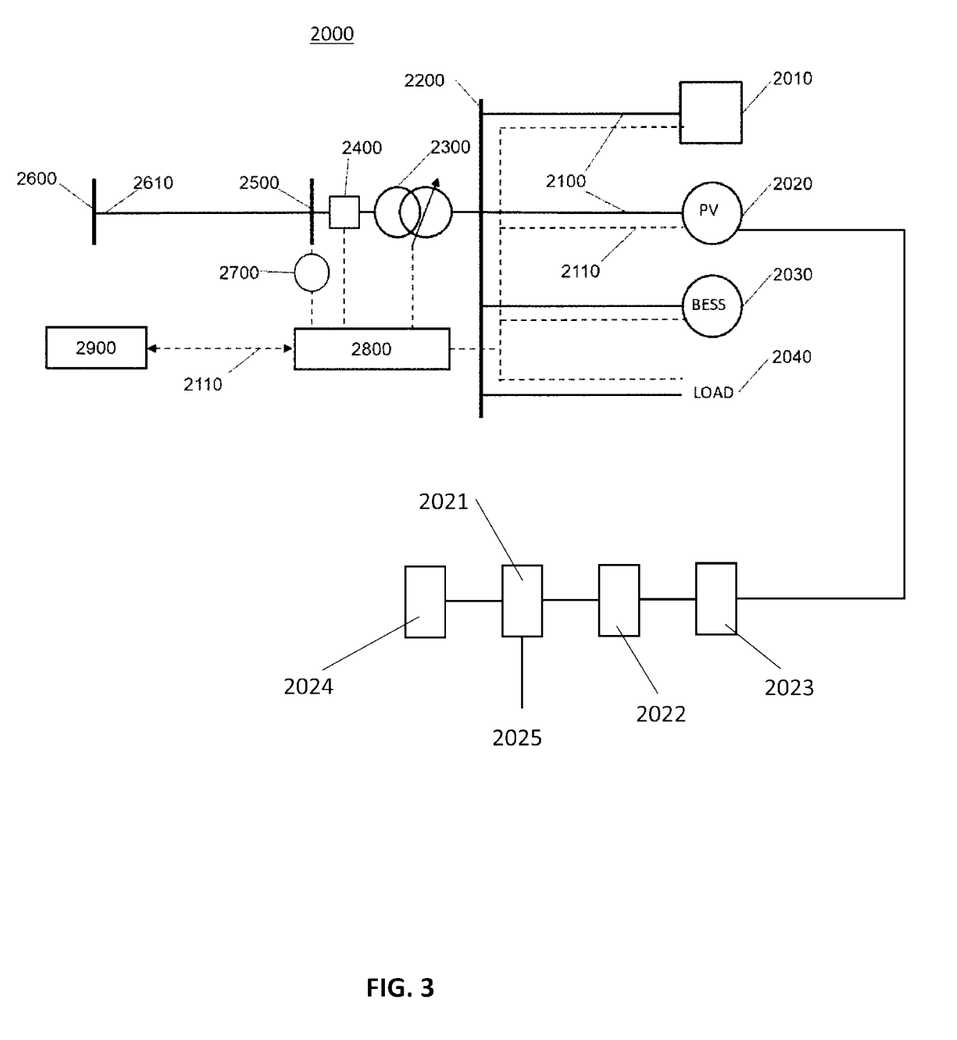
FIG. 3 is a block diagram illustrating a renewable energy plant in accordance with an embodiment of the application.

FIG. 3 is a block diagram illustrating a renewable energy plant 2000 in accordance with an embodiment of the invention. The renewable energy plant 2000 may be a photovoltaic plant. The photovoltaic plant 2000 may include a photovoltaic ("PV") system 2020 which includes photovoltaic arrays 2024, inverters 2021, and transformers 2023. An electrical collector subsystem, which includes feeders 2100 and a medium voltage bus 2200, connects the PV system 2020 to a generator step-up transformer 2300. The generator step-up transformer 2300 may be equipped with an on-load tap changer. The control system 2800 (e.g., information system 1000) controls the properties of the PV system 2020 at a point of common coupling 2600. The control system 2800 receives setpoints from a master SCADA/EMS 2900 (e.g., information system 1000) over a communications network 2110 (e.g., network 1700). The control system 2800 receives measurements 5011, 5012 such as power flow and frequency from a power meter 2700 located at a point of metering 2500. The plant 2000 may also include: a battery energy storage system ("BESS") 2030, an electric load 2040, shunt capacitors and reactor banks 2010, or combinations of these. Finally, a circuit breaker 2400 connects the plant 2000 to the electrical grid 2610.

Figure 4:
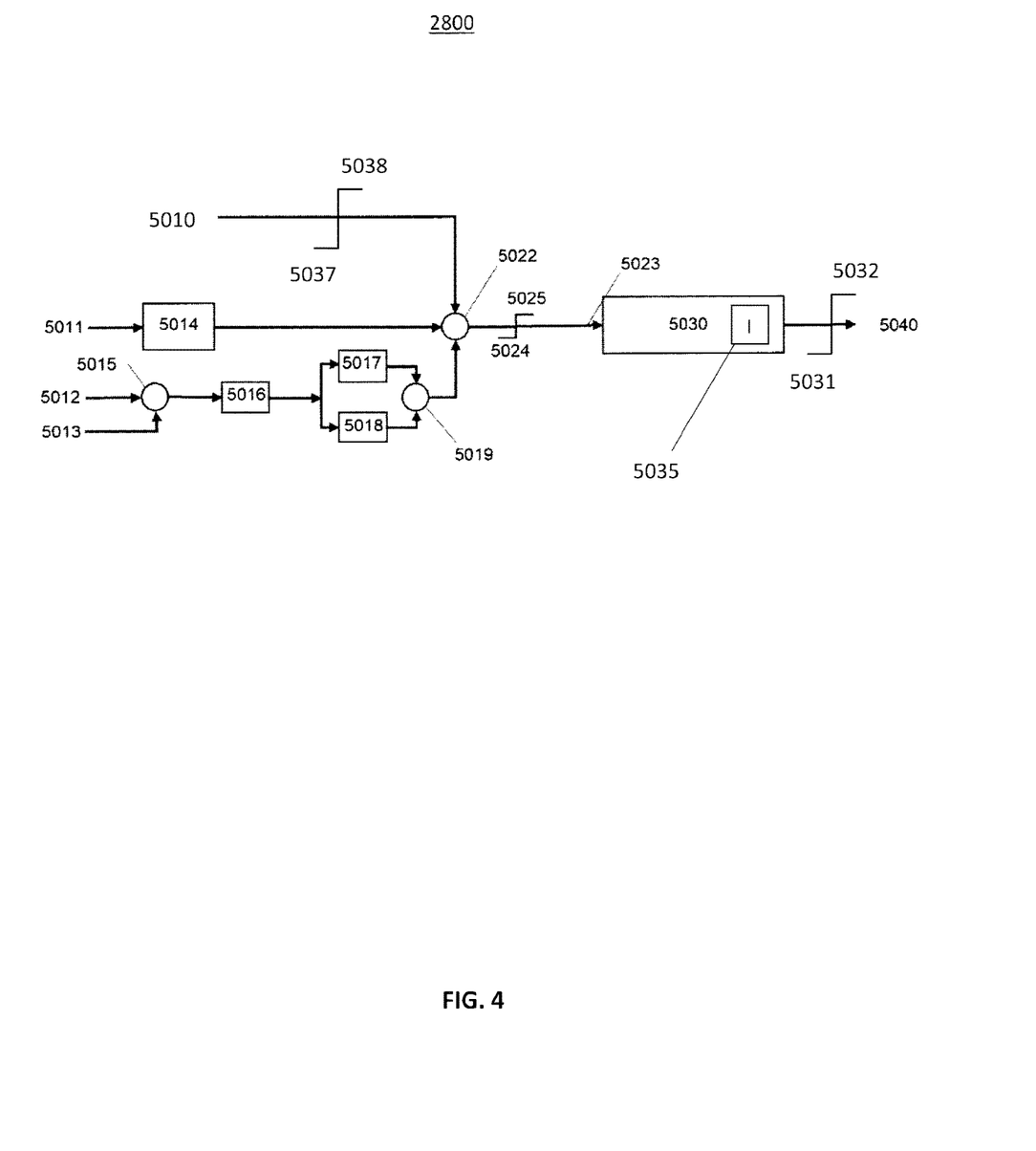
FIG. 4 is a block diagram illustrating a control system in accordance with an embodiment of the application; and, FIG. 5 is a flow chart illustrating operations of modules within an information system for providing primary frequency response for a renewable energy plant coupled to an electric power grid, the renewable energy plant having an intermittent energy source coupled thereto by an inverter, in accordance with an embodiment of the application.

FIG. 4 is a block diagram illustrating a control system 2800 in accordance with an embodiment of the application. Referring to FIG. 4, a power reference (or active power setpoint or curtailment setpoint) 5010 is received by the control system 2800. The power reference 5010 may be received from an operator via the user interface 1120 of the control system 2800 or from the independent system operator ("ISO") running an economic dispatch on a SCADA/EMS system 2900. Measured at the point of metering (e.g., 2500 in FIG. 3), power flow for plant regulation 5011 is processed through a filter 5014 and subtracted from the power reference 5010 in a summation block 5022 to form or generate an error signal 5023.

According to one embodiment, a low sustained limit ("LSL") setpoint 5037 for the renewable energy plant 2000 may be established by a qualified scheduling entity (e.g., by a remote energy management system 1000, SCADA/EMS system 2900, etc.). The LSL setpoint 5037 specifies the minimum sustained energy production capability of the plant 2000. The power reference 5010 is an analog value in the range between the LSL setpoint 5037 and a high sustained limit ("HSL") setpoint 5038. The LSL setpoint 5037 may be set to limit the power reference 5010. The LSL setpoint 5037 informs the ISO's economic dispatch that the renewable energy plant 2000 cannot be curtailed below this limit. The LSL setpoint 5037 may be implemented at the SCADA/EMS 2900 system and/or at the control system 2800 (or the controller 5030).

A frequency droop response (at 5019) is applied (at 5022) to the power reference 5010 (after being limited by the LSL setpoint 5037) and acts during frequency events (i.e., power system frequency outside of the deadband as described in the following). Measured frequency deviation (or power system frequency or frequency) 5012 is subtracted in block 5015 from a frequency deviation (or power system frequency or frequency) reference 5013. The droop is defined by an over- and under-frequency deadband block 5016. Down and up regulation droop is defined by blocks 5017 and 5018 and summation block 5019. The error signal 5023 is limited between minimum 5024 and maximum 5025 power error limits for the renewable energy plant 2000. The error signal 5023 is handled by a controller 5030 which may be a proportional-integral ("PI") controller or any other type of controller.

The controller output (or control signal) 5040 is limited between a low power limit 5031 and a high power limit 5032 for the inverter(s) 2021. The controller output 5040 is sent to the inverters 2021 to control the active power output of the inverter(s) 2021 (i.e., of the PV system 2020).

The low power limit 5031 is set at or above the inverter low power limit 2025 which is the level at which the inverter(s) 2021 will independently halt generating (e.g., at 1% of the nominal capacity of the inverter 2021). When the power reference 5010 is set below the LSL setpoint 5037, the low power limit 5031 prevents the controller output 5040 from dipping below the inverter low power limit 2025 thereby preventing the inverter 2021 from halting generation (i.e., of interrupting the delivery of power from the PV system 2020). In addition, during an over-frequency event, the low power limit 5031 prevents the controller output 5040 from dipping below the inverter low power limit 2025 thereby preventing the inverter 2021 from halting generation (i.e., of interrupting the delivery of power from the PV system 2020). Furthermore, while the controller output 5040 is limited by the low power limit 5031, the controller's integral function 5035 may be disabled to prevent integral windup.

For example, if the measured power output 5011 is 1.5 MW, the power reference 5010 is also 1.5 MW, the LSL setpoint 5037 is also 1.5 MW, the measured frequency deviation 5012 is 0 Hz, and the frequency deviation reference 5013 is 0 Hz (i.e., both the measured frequency and the frequency reference are 60 Hz), then the error signal 5023 (i.e., at 5022) would be 0 MW. Note again that the power reference 5010 is at the LSL setpoint 5037 of 1.5 MW. Since the measured frequency deviation 5012 and the frequency deviation reference 5013 are both 0 Hz (i.e., both are 60 Hz), then there is no over- or under-frequency event and the primary frequency response (i.e., at 5019) is 0 MW. In addition, the control signal 5040 output from the controller 5030 may be 2.0 MW which is the low power limit 5031 of the inverter 2021. Now, during an over-frequency event, the difference 5015 between the measured frequency deviation 5012 and the frequency deviation reference 5013 will increase above the deadband (e.g., typically 35 mHz/60 Hz) and the resultant negative value (or first difference signal) (i.e., at 5019) will be subtracted 5022 from the active power error (or second difference signal) resulting in an error signal 5023 (i.e., at 5022) of, say, −5.0 MW. The controller 5030 will then try to compensate for this error but it is already limited at 2.0 MW by the low power limit 5031. As such, the output 5040 from the controller will not dip below 2.0 MW.

As mentioned above, the lower power limit 5031, which is typically configured in the controller 5030, is set at or above the inverter low power limit 2025 preventing the inverter(s) 2021 from shutting down. According to one embodiment, when all the inverters 2021 are functioning properly, then the LSL setpoint 5037 is set above the power reference 5010 corresponding with the output control signal 5040 being at or above the lower power limit 5031 for the inverters 2021. If some of the inverters 2021 are faulted and not generating power, then the LSL setpoint 5037 may be decreased by not more than the generation loss of the inverters 2021 evaluated at the point of common coupling (or point of interconnection) 2600. If some of the inverters 2021 are generating power but are not controlled by the control system 2800, the LSL setpoint 5037 may be set higher by an amount of additional generation at the point of common coupling (or point of interconnection) 2600, that is, at least the generation of these non-controlled inverters 2021 less the power transportation loss between the inverters' terminals 2022 and the point of common coupling (or point of interconnection) 2600.

According to one embodiment, as illustrated in FIGS. 3 and 4, frequency control functionality may be embedded in an inverter (or inverters) 2021. In this case, power and frequency measurements 5011, 5012 are performed at the terminals 2022 of the inverter(s) 2021.

According to another embodiment, as illustrated in FIGS. 3 and 4, frequency control functionality may be partially embedded in an inverter (or inverters) 2021. In this case, for example, the power limits 5031, 5032 are implemented in the inverter(s) 2021.

According to one embodiment, there is provided a method for providing inverter-based, renewable energy plant 2000 frequency response, the plant 2000 having an intermittent energy source 2020, the method comprising: using a control system 2800, maintaining power flow to and from a power grid 2610 coupled to the renewable energy plant 2000 by: measuring active power flow for plant regulation 5011 and subtracting its value from a power reference 5010 to form an error signal; applying the frequency droop response to the power reference 5010 during frequency events; the frequency droop being characterized by deadband and regulation droop; and, handling the error signal by a controller 5030 to control the intermittent energy source 2020 when the controller output 5040 is limited by the low limit 5031 to prevent inverter 2021 generation halt. In the above method, the plant LSL 5037 which describes the minimum sustained energy production capability of the plant 2000 may be set to limit the power reference 5010. The intermittent energy source 2020 may include a wind turbine. The intermittent energy source 2020 may be one or more intermittent energy sources. The renewable energy plant 2000 may have an energy load 2040 coupled thereto. And, the energy load 2040 may be one or more energy loads.

According to one embodiment, there is provided a method for providing renewable energy plant frequency response, the plant 200 having an intermittent energy source 2020, the method comprising: using a control system 2800, maintaining power flow to and from a power grid 2610 coupled to the renewable energy plant 2020 by: measuring active power flow for plant regulation 5011 and subtracting its value from a power reference 5010 to form an error signal 5023; applying the frequency droop response to the power reference 5010 during frequency events; handling the resultant error signal by a controller 5030; limiting the controller output 5040 to prevent inverter 2021 halting operations; and, communicating the controller's output 5040 to control the intermittent energy source 2020.

The embodiments described herein may contribute to an improved method and system for providing primary frequency response and may provide one or more advantages. First, as the low power limit 5031 is set at or above the inverter(s) low power limit 5025, when the power reference 5010 is set below the plant LSL 5037, the low power limit 5031 prevents the controller output 5040 from dipping below the inverter low power limit 5025 thereby preventing the inverter(s) 2021 from halting generation. Second, during an over-frequency event, the low power limit 5031 prevents the controller output 5040 from dipping below the inverter low power limit 5025 thereby preventing the inverter(s) 2021 from halting generation. Third, when the controller output 5040 is limited by the low power limit 5031, the controller's integral function 5035 may be disabled to prevent integral windup.

Aspects of the methods and systems described herein may be illustrated with the aid of a flowchart.

Figure 5:
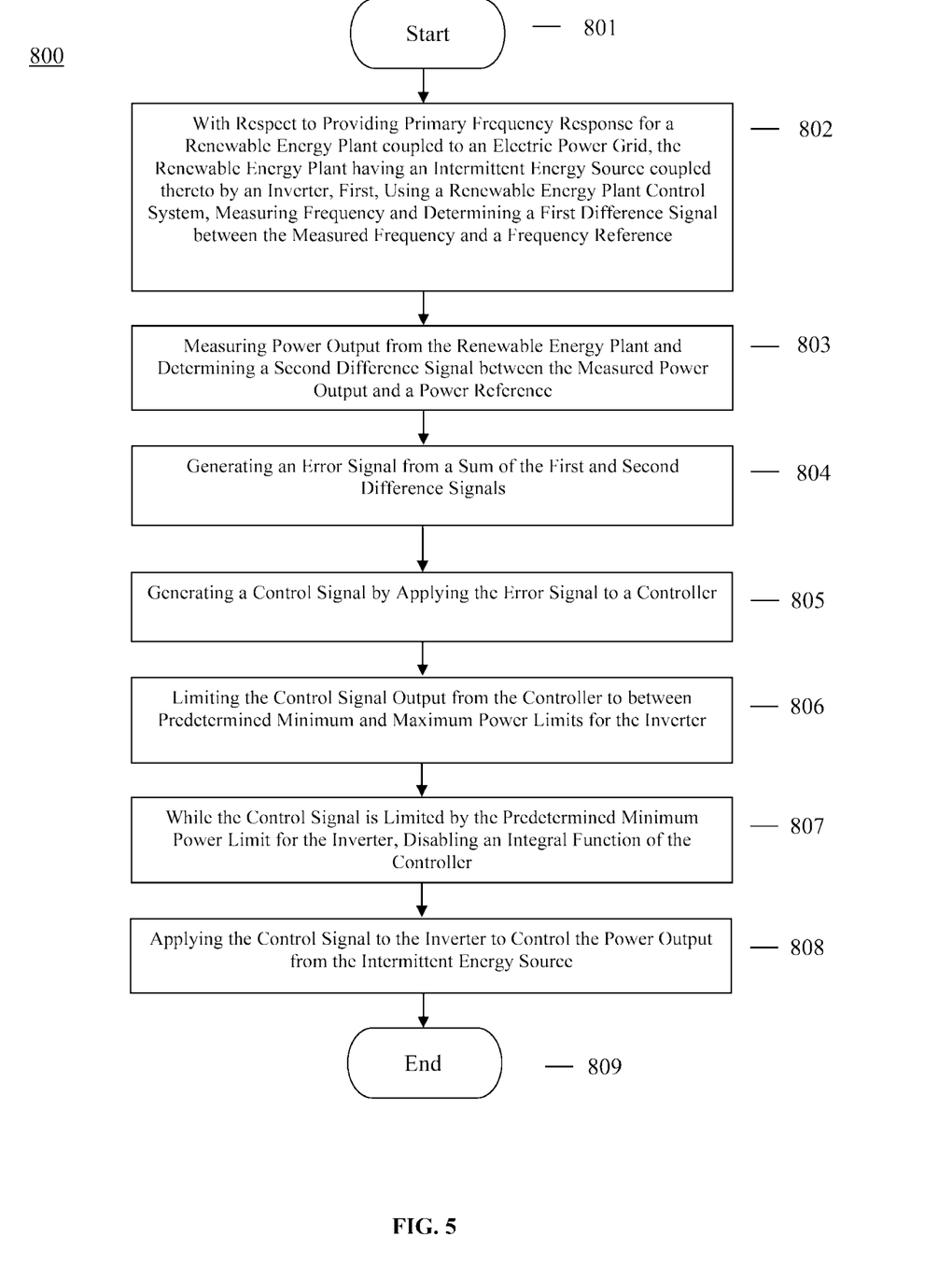

FIG. 5 is a flow chart illustrating operations 800 of modules (e.g., 1420, 1500) within an information system (e.g., 1000, 2800, 5030) for providing primary frequency response for a renewable energy plant 2000 coupled to an electric power grid 2610, the renewable energy plant 2000 having an intermittent energy source (e.g., 2020) coupled thereto by an inverter 2021, in accordance with an embodiment of the invention.

At step 801, the operations 800 start.

At step 802, using a renewable energy plant control system (e.g., 2800), frequency (or frequency deviation) is measured and a first difference signal between the measured frequency (or measured frequency deviation) 5012 and a frequency reference (or frequency deviation reference) 5013 is determined 5015.

At step 803, power output from the renewable energy plant 2000 is measured and a second difference signal between the measured power output 5011 and a power reference 5010 is determined 5022.

At step 804, an error signal 5023 is generated from a sum 5022 of the first and second difference signals.

At step 805, a control signal 5040 is generated by applying the error signal 5023 to a controller (or loop) 5030.

At step 806, the control signal 5040 output from the controller 5030 is limited to between predetermined minimum and maximum power limits 5031, 5032 for the inverter 2021.

At step 807, while the control signal 5040 is limited by the predetermined minimum power limit 5031 for the inverter 2021, an integral function 5035 of the controller 5030 is disabled.

At step 808, the control signal 5040 is applied to the inverter 2021 to control the power output from the intermittent energy source 2020.

At step 809, the operations 800 end.

The above method may further include limiting the power reference 5010 to at or above a low sustained limit ("LSL") setpoint 5037. The LSL setpoint 5037 may be set above the predetermined minimum power limit 2031 for the inverter 2021. The LSL setpoint 5037 may be communicated (or transmitted or sent) to an external system (e.g., 2900). The inverter 2021 may be two or more inverters 2021; and, the determination of the LSL setpoint 5037 may take into account lost power from a faulted inverter 2021 and/or power generated by an inverter 2021 not controlled by the control system 2800. The predetermined minimum power limit 2031 for the inverter 2021 may be set at or above a predetermined inverter low power limit 2025; and, the predetermined inverter low power limit 2025 may be a level at which the inverter 2021 will independently halt operation. The method may further include: storing the measured power output as a stored measured power output value (e.g., in the memory 1400 of the control system 2800); while the first difference signal is within a predetermined frequency deviation deadband 5016, determining 5022 the second difference signal as a difference between the power reference 5010 and the measured power output 5011; while the first difference signal indicates an over-frequency condition, determining 5022 the second difference signal as a difference between the stored measured power output value and the measured power output 5011; and, while the first difference signal indicates an under-frequency condition, setting the second difference signal equal to the power reference 5010. The power reference 5010 may be disregarded while the first difference signal is outside of the predetermined frequency deviation deadband 5016. The error signal 5023 may be limited between predetermined minimum and maximum power error limits 5024, 5025 for the renewable energy plant 2000 before being applied to the controller 5030. The intermittent energy source may include a photovoltaic energy source 2020. The intermittent energy source may include a wind turbine. The intermittent energy source 2020 may be one or more intermittent energy sources. The inverter 2021 may be one or more inverters. The renewable energy plant 2000 may have at least one energy load 2040 coupled thereto. The renewable energy plant 2000 may have at least one controllable load 2040 coupled thereto. The renewable energy plant 2000 may have at least one energy storage 2030 coupled thereto. The controller 5030 may be a proportional-integral ("PI") controller or loop. And, the control signal 5040 may be applied to the inverter 2021 of the intermittent energy source 2020 to control the power output therefrom and to maintain power flow to and from the electric power grid 2610 coupled to the renewable energy plant 2000.

According to one embodiment, each of the above steps 801-809 may be implemented by a respective software module 1420. According to another embodiment, each of the above steps 801-809 may be implemented by a respective hardware module 1500 (e.g., application-specific hardware 1500). According to another embodiment, each of the above steps 801-809 may be implemented by a combination of software 1420 and hardware modules 1500. For example, FIG. 5 may represent a block diagram illustrating the interconnection of specific hardware modules 801-809 (collectively 1500) within the information system or systems 1000, each hardware module 801-809 adapted or configured to implement a respective step of the method of the application.

According to one embodiment, one or more of the software 1420 and hardware modules 1500 (or to components referred to as a "module" herein) may be implemented by one or more information systems 1000 or components thereof.

According to one embodiment, certain implementations of the functionality of the present application are sufficiently mathematically, computationally, or technically complex that application-specific hardware (e.g., 1500) or one or more physical computing devices (e.g., 1000, 2800, 5030) (using appropriate executable instructions (e.g., 1420)) may be necessary or essential to perform that functionality, for example, due to the volume or complexity of the calculations involved and/or to provide results substantially in real-time.

While this application is primarily discussed as a method, a person of ordinary skill in the art will understand that the apparatus discussed above with reference to an information system 1000 may be programmed to enable the practice of the method of the invention. Moreover, an article of manufacture for use with an information system 1000, such as a pre-recorded storage device or other similar computer readable medium or computer program product including program instructions recorded thereon, may direct the information system 1000 to facilitate the practice of the method of the invention. It is understood that such apparatus, products, and articles of manufacture also come within the scope of the invention.

In particular, the sequences of instructions which when executed cause the method described herein to be performed by the information system 1000 may be contained in a data carrier product according to one embodiment of the invention. This data carrier product may be loaded into and run by the information system 1000. In addition, the sequences of instructions which when executed cause the method described herein to be performed by the information system 1000 may be contained in a computer software product or computer program product (e.g., comprising a non-transitory medium) according to one embodiment of the invention. This computer software product or computer program product may be loaded into and run by the information system 1000. Moreover, the sequences of instructions which when executed cause the method described herein to be performed by the information system 1000 may be contained in an integrated circuit product (e.g., a hardware module or modules 1420, 1500) which may include a coprocessor or memory according to one embodiment of the invention. This integrated circuit product may be installed in the information system 1000.

The embodiments of the application described above are intended to be examples only. Those skilled in the art will understand that various modifications of detail may be made to these embodiments, all of which come within the scope of the invention.

What is claimed is:

1. A method for providing primary frequency response for a renewable energy plant coupled to an electric power grid, the renewable energy plant having an intermittent energy source coupled thereto by an inverter, the method comprising:
   using a renewable energy plant control system, measuring frequency and determining a first difference signal between the measured frequency and a frequency reference;
   measuring power output from the renewable energy plant and determining a second difference signal between the measured power output and a power reference;
   generating an error signal from a sum of the first and second difference signals;
   generating a control signal by applying the error signal to a controller;
   limiting the control signal output from the controller to between predetermined minimum and maximum power limits for the inverter;
   while the control signal is limited by the predetermined minimum power limit for the inverter, disabling an integral function of the controller;
   applying the control signal to the inverter to control the power output from the intermittent energy source; and,
   limiting the power reference to at or above a low sustained limit ("LSL") setpoint;
   wherein the inverter is two or more inverters; and,
   wherein determination of the LSL setpoint takes into account lost power from a faulted inverter and/or power generated by an inverter not controlled by the control system.

2. The method of claim 1,
   wherein the predetermined minimum power limit for the inverter is set at or above a predetermined inverter low power limit; and,
   wherein the predetermined inverter low power limit is a level at which the inverter will independently halt operation.

3. The method of claim 1, wherein LSL setpoint is set above the predetermined minimum power limit for the inverter.

4. The method of claim 1, wherein the LSL setpoint is communicated to an external system.

5. The method of claim 1, further comprising:
   storing the measured power output as a stored measured power output value;
   while the first difference signal is within a predetermined frequency deviation deadband, determining the second difference signal as a difference between the power reference and the measured power output;

while the first difference signal indicates an over-frequency condition, determining the second difference signal as a difference between the stored measured power output value and the measured power output; and, while the first difference signal indicates an under-frequency condition, setting the second difference signal equal to the power reference.

6. The method of claim 5, wherein the power reference is disregarded while the first difference signal is outside of the predetermined frequency deviation deadband.

7. The method of claim 1, wherein the error signal is limited between predetermined minimum and maximum power error limits for the renewable energy plant before being applied to the controller.

8. The method of claim 1, wherein the intermittent energy source includes a photovoltaic energy source.

9. The method of claim 1, wherein the intermittent energy source includes a wind turbine.

10. The method of claim 1, wherein the intermittent energy source is one or more intermittent energy sources.

11. The method of claim 2, wherein the inverter is one or more inverters.

12. The method of claim 1, wherein the renewable energy plant has at least one energy load coupled thereto.

13. The method of claim 1, wherein the renewable energy plant has at least one controllable load coupled thereto.

14. The method of claim 1, wherein the renewable energy plant has at least one energy storage coupled thereto.

15. The method of claim 1, wherein the controller is a proportional-integral ("PI") controller or loop.

16. The method of claim 1, wherein the control signal is applied to the inverter of the intermittent energy source to control the power output therefrom and to maintain power flow to and from the electric power grid coupled to the renewable energy plant.

17. A control system for providing primary frequency response for a renewable energy plant coupled to an electric power grid, the renewable energy plant having an intermittent energy source coupled thereto by an inverter, the control system comprising:
   a processor coupled to memory; and,
   at least one of hardware and software modules within the memory and controlled or executed by the processor, the modules including computer readable instructions executable by the processor for causing the control system to implement the method of claim 1.

18. The method of claim 1, wherein the predetermined inverter low power limit is greater than 0% of a nominal capacity of the inverter.

19. The method of claim 1, wherein the predetermined inverter low power limit is 1% of a nominal capacity of the inverter.

20. A method for providing primary frequency response for a renewable energy plant coupled to an electric power grid, the renewable energy plant having an intermittent energy source coupled thereto by an inverter, the method comprising:
   using a renewable energy plant control system, measuring frequency and determining a first difference signal between the measured frequency and a frequency reference;
   measuring power output from the renewable energy plant and determining a second difference signal between the measured power output and a power reference;
   generating an error signal from a sum of the first and second difference signals;
   generating a control signal by applying the error signal to a controller;
   limiting the control signal output from the controller to between predetermined minimum and maximum power limits for the inverter;
   while the control signal is limited by the predetermined minimum power limit for the inverter, disabling an integral function of the controller;
   applying the control signal to the inverter to control the power output from the intermittent energy source;
   storing the measured power output as a stored measured power output value;
   while the first difference signal is within a predetermined frequency deviation deadband, determining the second difference signal as a difference between the power reference and the measured power output;
   while the first difference signal indicates an over-frequency condition, determining the second difference signal as a difference between the stored measured power output value and the measured power output; and,
   while the first difference signal indicates an under-frequency condition, setting the second difference signal equal to the power reference.

* * * * *